United States Patent
Domby (10) Patent No.: US 11,077,874 B1
(45) Date of Patent: Aug. 3, 2021

(54) MOVABLE CRAWL SPACE CONTAINER (71) Applicant: Eric Domby, Livermore, CA (US)

(72) Inventor: Eric Domby, Livermore, CA (US)

(*) Notice: Subject to any disclaimer, the term of this patent is extended or adjusted under 35 U.S.C. 154(b) by 80 days.

(21) Appl. No.: 16/241,993

(22) Filed: Jan. 8, 2019

Related U.S. Application Data (60) Provisional application No. 62/614,655, filed on Jan. 8, 2018.

(51) Int. Cl.
| B65D 85/28 | (2006.01) |
| B62B 13/06 | (2006.01) |
| B25H 3/06 | (2006.01) |
| B61B 12/00 | (2006.01) |
| E04B 1/343 | (2006.01) |

(52) U.S. Cl.
CPC .............. *B62B 13/06* (2013.01); *B25H 3/06* (2013.01); *B61B 12/007* (2013.01); *E04B 2001/34389* (2013.01)

(58) Field of Classification Search
CPC .. B65D 1/36; B25H 3/06; B62B 13/06; B61B 12/007; E04B 2001/34389
USPC ................ 206/373, 564, 565; 220/560, 571; 280/18, 19
See application file for complete search history.

(56) References Cited

U.S. PATENT DOCUMENTS

| 715,572 | A | * | 12/1902 | Gregg | B62B 15/00 280/19 |
| 3,937,482 | A | * | 2/1976 | Johnson | B62B 15/00 280/18 |
| 5,653,455 | A | * | 8/1997 | Richards | B62B 5/068 280/1.5 |
| 5,713,468 | A | * | 2/1998 | Streichan | B25H 3/02 190/8 |
| 6,910,429 | B1 | * | 6/2005 | Matay | B25H 3/06 108/152 |
| 6,926,293 | B1 | * | 8/2005 | Pope | B62B 5/0083 280/19 |
| 10,500,714 | B2 | * | 12/2019 | Hunter | B23Q 3/15 |
| 2006/0028819 | A1 | * | 2/2006 | Shankland | B25H 3/06 362/253 |
| 2007/0138752 | A1 | * | 6/2007 | Kress | B25H 3/06 280/19 |
| 2013/0277927 | A1 | * | 10/2013 | Harvey | B62B 15/007 280/19 |
| 2016/0194020 | A1 | * | 7/2016 | Coates | B62B 13/06 414/800 |

* cited by examiner

*Primary Examiner* — Luan K Bui
(74) *Attorney, Agent, or Firm* — Adibi IP Group, PC; Amir V. Adibi; Ryan D. Smith

(57) ABSTRACT

A movable crawl space container comprises a body portion and two amounts of rope that extend from opposite sides of the container. The container has an opening and retains needed equipment within the confines of the container. The container has pointed edges near the first end of the container and near the second end of the container that assist the container in traversing corners and other obstacles found in typical crawl spaces. Sides of the container converge towards rope connection portions on both ends of the container. A worker, such as a plumber, can pull the container down into the crawl space and easily move around the crawl space pulling the container as desired. By placing all the necessary tools in the container, the plumber is able to visit various work sites while maintaining access to tools and other desired items stored in the container.

11 Claims, 8 Drawing Sheets

PERSPECTIVE VIEW OF A MOVABLE CRAWL SPACE CONTAINER

PERSPECTIVE VIEW OF A MOVABLE CRAWL SPACE CONTAINER

FIG. 1

TOP VIEW OF MOVABLE CRAWL SPACE CONTAINER
FIG. 2

SIDE VIEW OF MOVABLE CRAWL SPACE CONTAINER
FIG. 3

PERSPECTIVE VIEW OF CRAWL SPACE
FIG. 4

PERSPECTIVE VIEW SHOWING USE OF MOBILE CRAWL SPACE CONTAINER IN CRAWL SPACE

FIG. 5

MOVABLE CRAWL SPACE CONTAINER TRAVERSING SHARP CORNER

FIG. 6

MOVABLE CRAWL SPACE CONTAINER TRAVERSING CIRCULRAR-SHAPED COLUMN

FIG. 7

SIDE VIEW OF MOVABLE CRAWL SPACE CONTAINER WITH LIGHT SOURCE (ANOTHER EMBODIMENT)

FIG. 8

FORMING CRAWL SPACE CONTAINER
FIG. 9

MOVABLE CRAWL SPACE CONTAINER

CROSS-REFERENCE TO RELATED APPLICATIONS

This application claims the benefit under 35 U.S.C. § 119 of U.S. provisional patent application Ser. No. 62/614,655, entitled "Movable Crawl Space Container," filed on Jan. 8, 2018. The subject matter of U.S. provisional patent application Ser. No. 62/614,655 is incorporated herein by reference.

TECHNICAL FIELD

The described embodiments relate to construction and repair equipment, and more particularly to work-site mobile containers.

BACKGROUND INFORMATION

Residential and business structures often involve work beneath a base or ground level of the structures. In such cases, a worker will have to go down into a tight crawl space below the ground level to work on areas needing maintenance. Crawl spaces are often low and require the worker to crawl on their knees to access the repair site. In addition, workers are often in the crawl space for long periods of time. Generally, it is desirable to minimize the amount of times workers come out of the crawl space so that the work can be completed as fast as possible. Techniques that permit workers to work efficiently and effectively in crawl spaces are desired.

SUMMARY

A movable crawl space container comprises a body portion and two amounts of rope that extend from opposite sides of the container. The container has an opening and retains needed equipment within the confines of the container. The container has pointed edges near the first end of the container and near the second end of the container that assist the container in traversing corners and other obstacles found in typical crawl spaces. Sides of the container converge towards rope connection portions on both ends of the container. A worker, such as a plumber, can pull the container down into the crawl space and easily move around the crawl space pulling the container as desired. By placing all the necessary tools in the container, the plumber is able to visit various work sites while maintaining access to tools and other desired items stored in the container.

The ropes include a stopper that prevents the ropes from passing through the inside of the container. The stoppers also serve to apply a rear force when the rope on the side opposite the stopper is pulled. This rear force assists the container in getting around corners, columns, and other obstacles. In one example, the two amounts of rope are different segments of rope that are attached to each of the rope connection portions. In another example, the two amounts are rope are part of one unitary piece of rope that extends all the way through the container. In yet another example, the two amounts are rope are part of one unitary piece of rope that extends through a pipe that is disposed within the container. The pipe permits the rope to remain in the container without interfering with items disposed within the container.

In one embodiment, the container has an elliptical or hexagonal shape. The container size is designed for a wide range of crawl spaces. Some of the novel mobile crawl space containers are manufactured having smaller or larger dimensions depending on the size of the crawl space. The container is manufactured to fit within a rectangle having approximate dimensions of between 18.0 inches by 12.0 inches and 5.0 feet by 2.0 feet, when viewed from a top down perspective. The container is formed from plastic injection molding, plastic rotational casting, 3D printing, woven or chopped strand mat fiberglass, carbon fiber, or Kevlar.

Further details and embodiments and methods are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
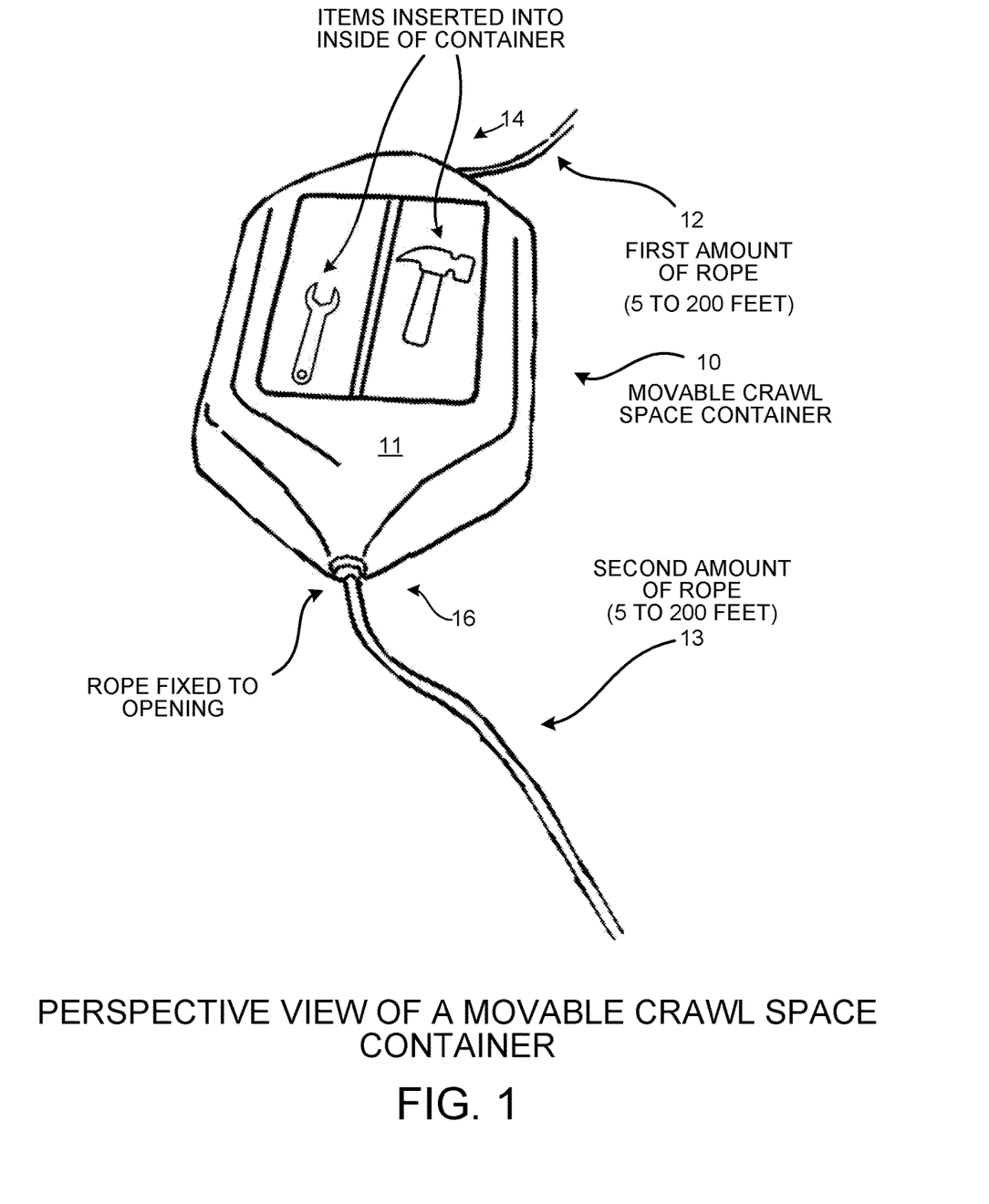
FIG. 1 is a diagram of a perspective view of a movable crawl space container.

FIG. 1 is a diagram of a perspective view of a movable crawl space container 10. The movable crawl space container has a body portion 11, a first amount of rope 12, and a second amount of rope 13. In this example, the first amount of rope and the second amount of rope are part of a single and unitary rope (or cable) structure that extends through the container 10. The first amount 12 of rope extends from a first end 14 of the container 10 through a first rope connection portion 15. The second amount of rope 13 extends from a second end 16 of the container 10 through a second rope connection portion 17. The first and second amounts of rope 12 and 13 extend at least 5.0 feet away from the ends of the container 10. In one example, the first and second amounts of rope 12 and 13 extend from between 5.0 to 200.0 feet from the ends of the container 10.

In accordance with one novel aspect, a worker is able to insert tools, parts, and necessary equipment into the body portion 11 of the movable crawl space container 10. For example, FIG. 1 shows a wrench and hammer stored in the movable crawl space container 10. The movable crawl space container 10 is taken below a structure into a crawl space with the worker's items. The worker is able to access the items throughout various locations of the crawl space. As the movable crawl space container 10 is pulled around the crawl space, the movable crawl space container 10 may come into contact with obstacles such as corners, columns, or other structures. When the movable crawl space container 10 comes into contact with such obstacles, the slanted edges 18, 19, 20, and 21 that form the pointed ends of the container contact the obstacle and permit the movable crawl space container to traverse such obstacles without getting stuck.

Figure 2:
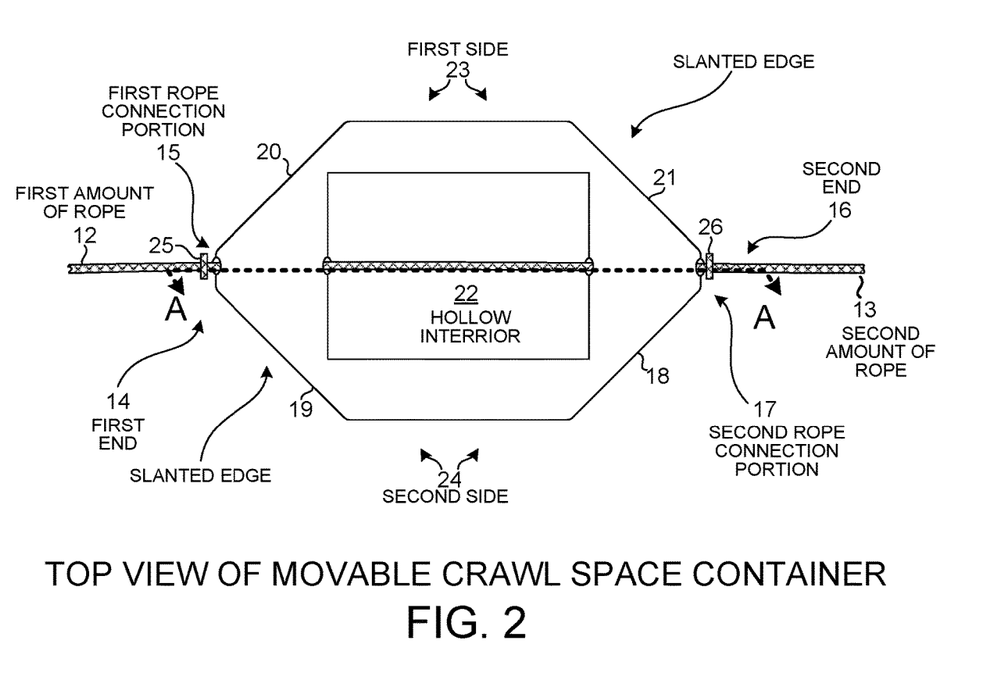
FIG. 2 is a diagram of a top view of the movable crawl space container.

FIG. 2 is a diagram of a top view of the movable crawl space container 10. In this example, the rope extends through the hollow interior 22 of the container 10. The first side 23 and second side 24 converge towards the first end 14 forming a first pointed end portion of the container. The first side 23 and second side 24 converge towards the second end 16 forming a second pointed end portion of the container. Each pointed end portion includes at least two slanted edges 19 and 20 and 18 and 21. In other embodiments, only one end of the container 10 has slanted edges that form a pointed shape. From a top down perspective, the container 10 has an elliptical shape. In another embodiment, the container 10 has a triangular shape when viewed from a top down perspective. In yet another embodiment, the container 10 is shaped as a polygon with at least three sides when viewed from a top down perspective.

Figure 3:
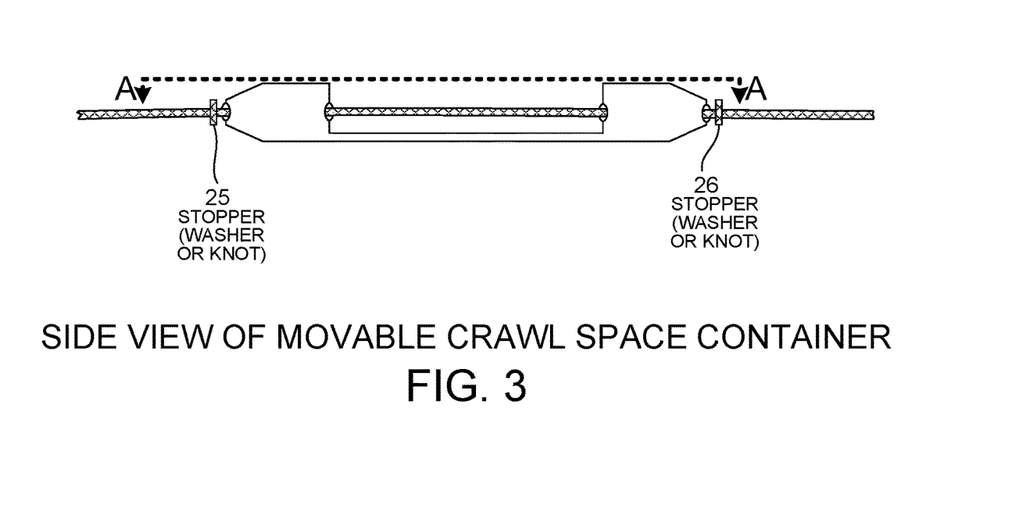
FIG. 3 is a diagram of a side view of the movable crawl space container.

FIG. 3 is a diagram of a side view of the movable crawl space container 10. Cross-section A of FIG. 2 is shown. In other examples, a pipe or other structure extends from the first rope connection portion 15 to the second rope connection portion 17 thereby forming a shield around the rope that is disposed within the container 10. This prevents items from interfering with movement of the rope as the movable crawl space container 10 is dragged throughout space.

The first and second amounts of rope 12 and 13 include stoppers 25 and 26 that prevent the entirety of the rope from passing through the container. The stopper is formed by forming a knot that is larger than an opening of the first rope connection portion. In another embodiment, the stopper is a washer that is permanently fixed to the rope and is larger than an opening of the first rope connection portion. Each stopper 25 and 26 applies a rear force to an end of the container 10 when the amount of rope on the opposite side of the stopper is pulled away from the container 10. This assists in getting around obstacles in the crawl space. Although two stoppers 25 and 26 are shown in the example of FIG. 2, in other embodiments, only one stopper is provided at one end of the container 10.

Figure 4:
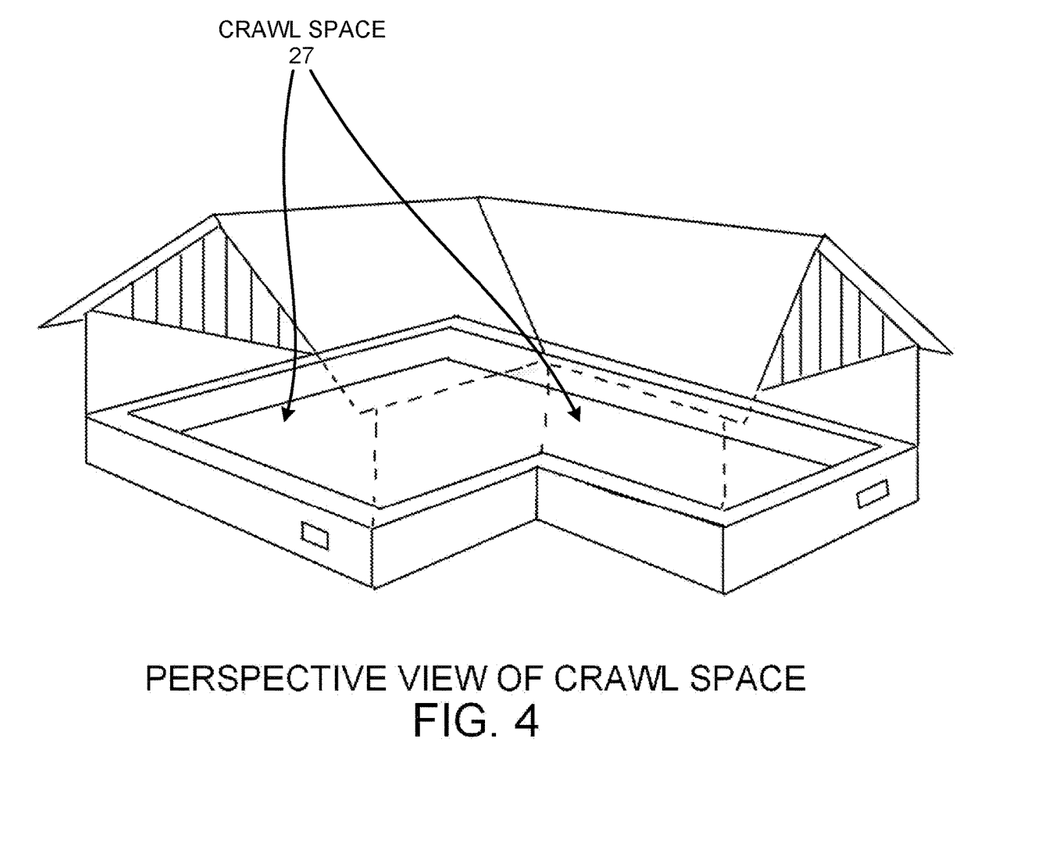
FIG. 4 is a diagram of a perspective view of a crawl space.

FIG. 4 is a diagram of a perspective view of a crawl space 27. Typical crawl spaces are between 1.5 feet to 4.0 feet. Crawl spaces are found in residential buildings, business buildings, manufacturing sites, and in other structures.

Figure 5:
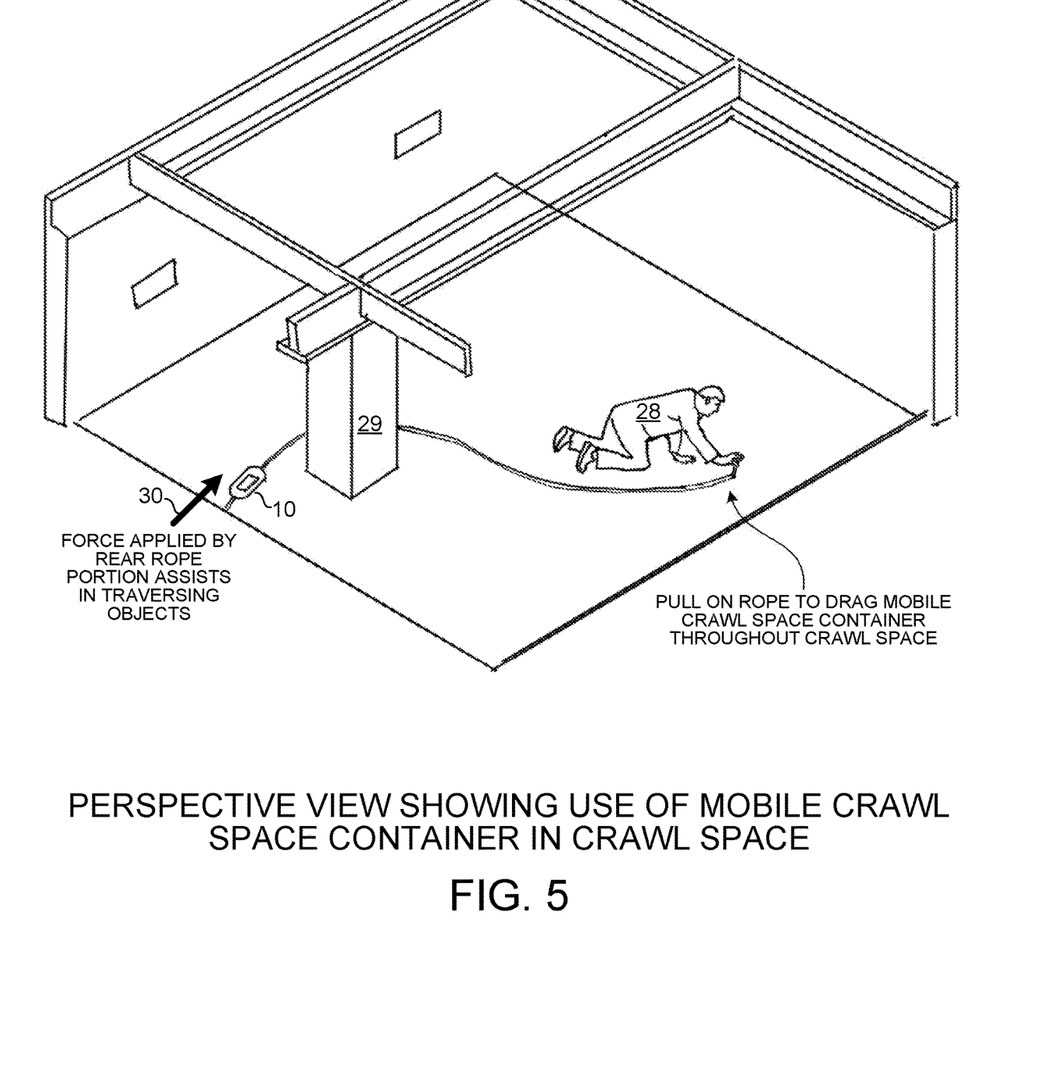
FIG. 5 is a diagram of a perspective view showing a plumber in a crawl space pulling the container via one of the ropes.

FIG. 5 is a diagram of a perspective view showing a plumber 28 in a crawl space pulling the container 10 via one of the ropes 12 and 13. In this example, the worker 28 is a plumber who is accessing work sites in the crawl space 27. The plumber 28 pulls on one of the rope segments to drag the movable crawl space container 10 around an obstacle 29. The movable crawl space container 10 does not get stuck on the obstacle due, in part to the curved ends of the container. In addition, by providing rope on both sides, pulling the rope causes the rope located on the opposite side to apply a force 30 along a rear of the container 10. This applied rear force is shown by the thicker line and arrow shown in FIG. 5. This applied rear force 30 also provides stability and extra force to traverse sharp corners.

Figure 6:
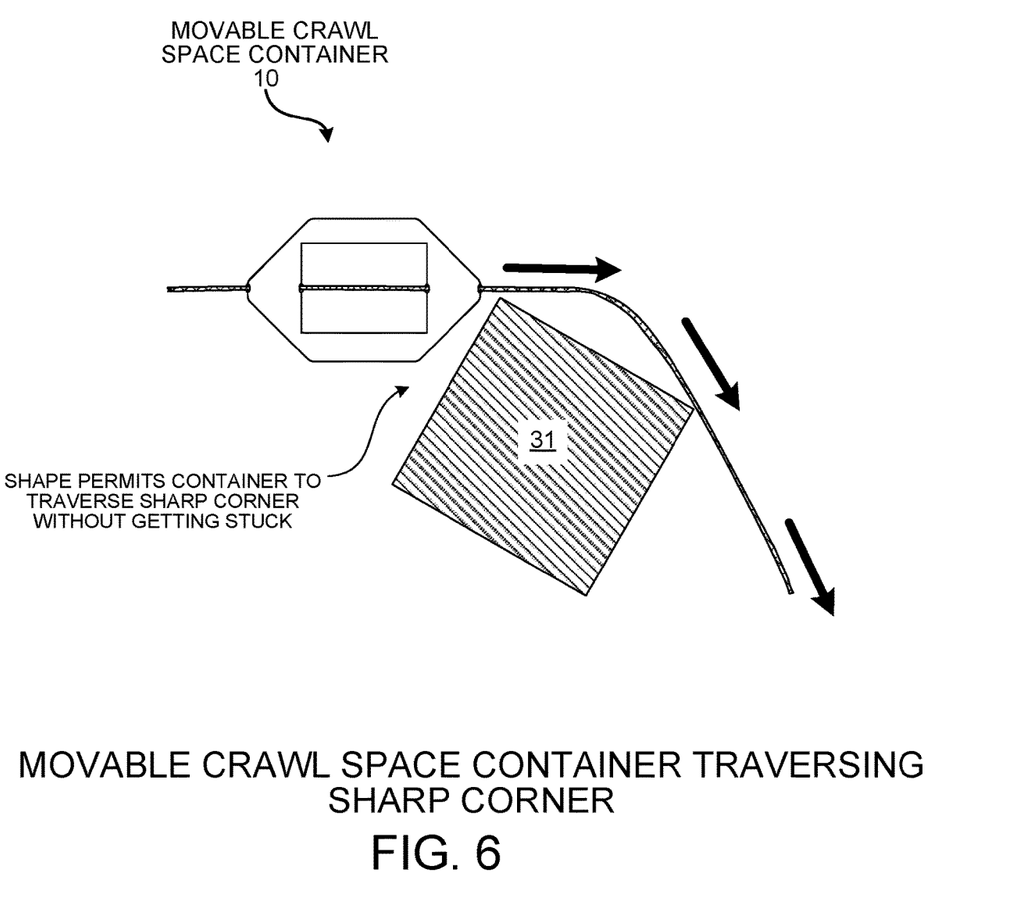
FIG. 6 is a diagram of a top view showing how the contoured shape of the container allows the movable crawl space container to traverse sharp corners.

FIG. 6 is a diagram of a top view showing how the slanted edges 18, 19, 20, and 21 and pointed shape of the container 10 allows the movable crawl space container 10 to traverse sharp corners of an obstacle 31. The pointed ends allow the container to contact the corner and smoothly travel around the corner without getting stuck behind the obstacle 31.

Figure 7:
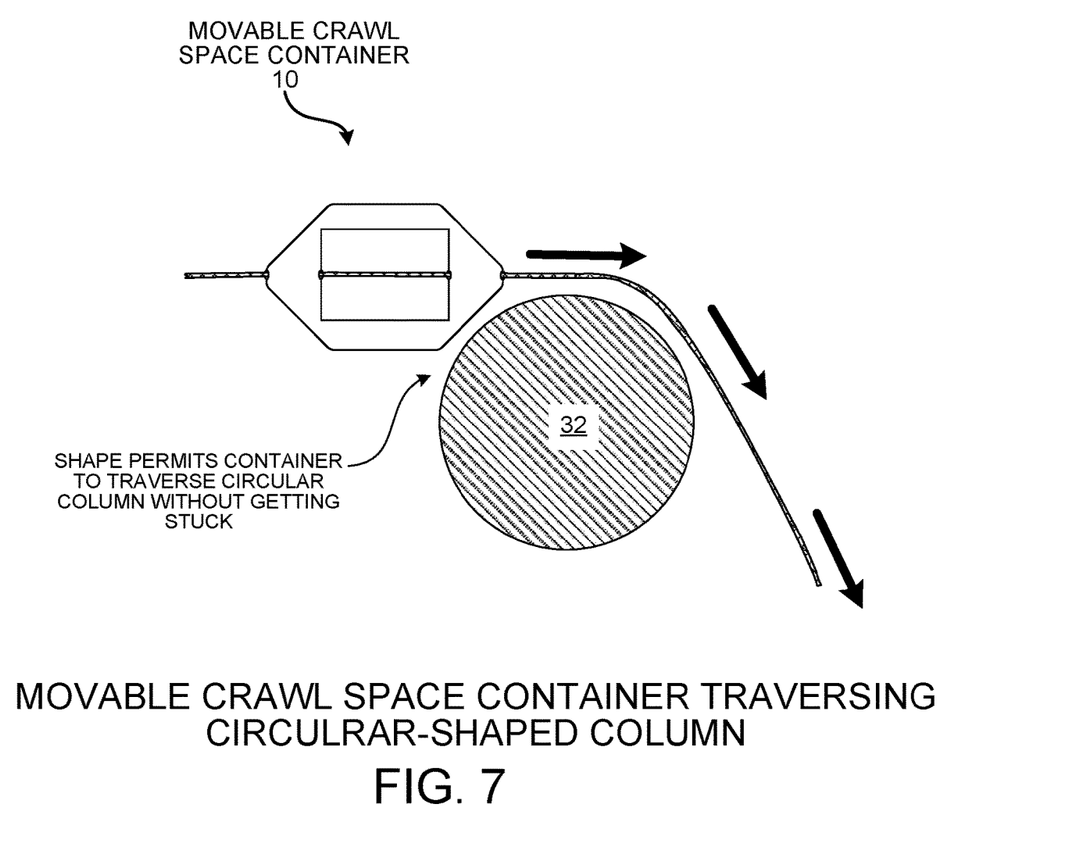
FIG. 7 is a diagram of a top view showing how the contoured shape of the container allows the movable crawl space container to traverse circular columns.

FIG. 7 is a diagram of a top view showing how the slanted edges 18, 19, 20, and 21 and pointed shape of the container 10 allows the movable crawl space container 10 to traverse circular columns 32. The pointed ends allow the container to contact the column and smoothly travel around the column 32 without getting stuck.

Figure 8:
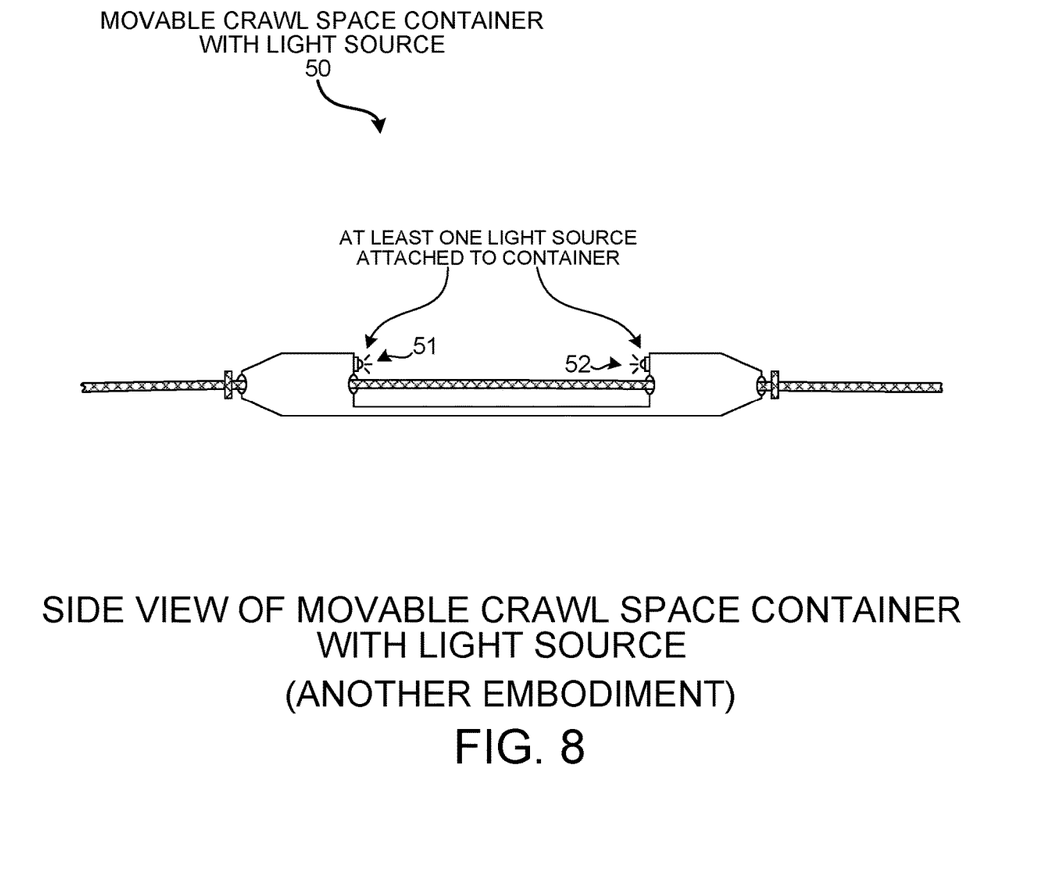
FIG. 8 is a diagram of a side view of another embodiment of a mobile crawl space container having light sources.

FIG. 8 is a diagram of a side view of another embodiment of a mobile crawl space container 50. The mobile crawl space container 50 shown in FIG. 8 includes at least one light source 51 and 52 inside the container. This assists the worker in seeing the inside of the container 50 when in a dark crawl space. In other embodiments, the container includes light sources only on the inside of the container, only on the outside of the container, or on both the inside of the container and on the outside of the container.

Figure 9:
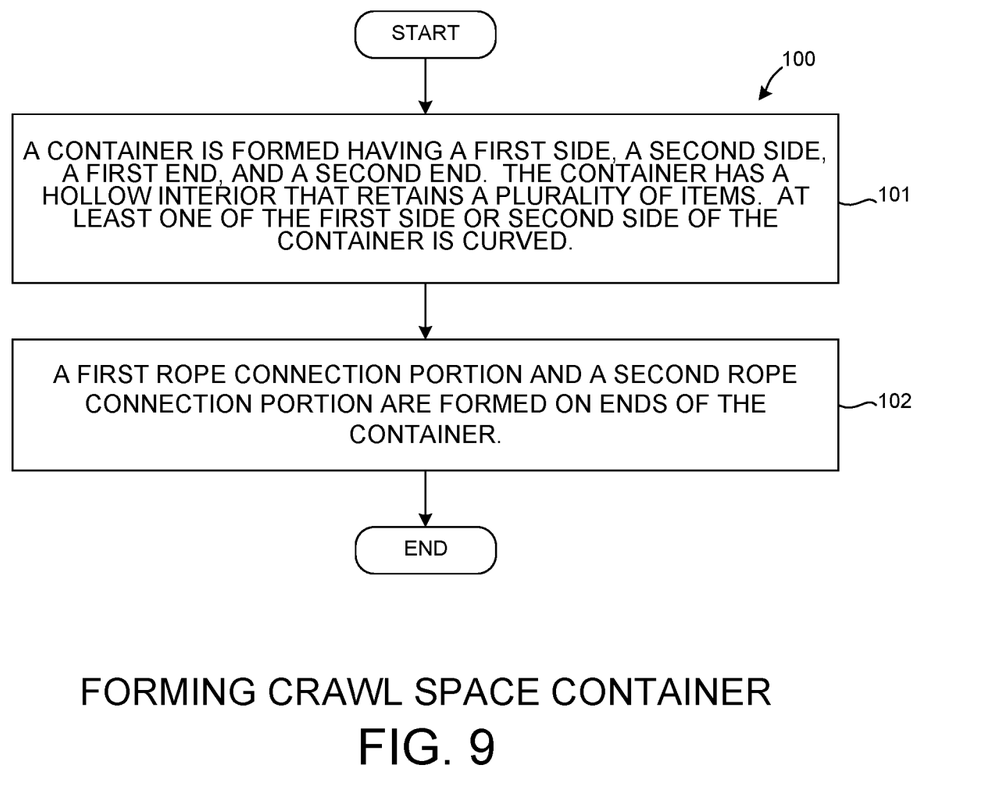
FIG. 9 is a flowchart of a method 100 in accordance with at least one novel aspect.

FIG. 9 is a flowchart of a method 100 in accordance with at least one novel aspect. In a first step (step 101), a container is formed having a first side, a second side, a first end, and a second end. The container has a hollow interior that retains a plurality of items. At least one of the first side or second side of the container is curved.

In a second step (102), a first rope connection portion and a second rope connection portion are formed on ends of the container.

Although certain specific exemplary embodiments are described above in order to illustrate the invention, the invention is not limited to the specific embodiments. For example, although the figures show the container has no lid or cover, in other embodiments, the container is provided with a cover. The cover prevents objects from falling out of the container during use. In other embodiments, the container includes a light source that provides additional lighting in the crawl space. In other embodiments, the container includes a portable battery that supplies electronic devices used by workers in crawl spaces. Accordingly, various modifications, adaptations, and combinations of various features of the described embodiments can be practiced without departing from the scope of the invention as set forth in the claims.

What is claimed is:

1. An apparatus comprising:
   a container, wherein the container has a first side, a second side, a first end, and a second end, wherein the first end has a first rope connection portion, wherein the container has a hollow interior that receives a plurality of items, and wherein the first side and the second side slant towards the first rope connection portion on the first end of the container;
   a first amount of rope that extends from the first rope connection portion; and
   a second amount of rope that extends from a second rope connection portion, wherein the first amount of rope and the second amount of rope are parts of a single piece of rope, wherein the single piece of rope extends through the first rope connection portion, through at least part of the hollow interior, and through the second rope connection portion, wherein the container has slanted edges near the first end of the container, and wherein the container has slanted edges near the second end of the container.

2. An apparatus comprising:
   a container, wherein the container has a first side, a second side, a first end, and a second end, wherein the first end has a first rope connection portion, wherein the container has a hollow interior that receives a plurality of items, and wherein the first side and the second side slant towards the first rope connection portion on the first end of the container;

a first amount of rope that extends from the first rope connection portion; and a second amount of rope that extends from a second rope connection portion, wherein the first amount of rope and the second amount of rope are parts of a single piece of rope, and wherein the single piece of rope extends through the first rope connection portion, through at least part of the hollow interior, and through the second rope connection portion.

3. The apparatus of claim 2, wherein the first amount of rope extends at least 5.0 feet.

4. The apparatus of claim 2, wherein the container has an elliptical shape when viewed from a top-down perspective.

5. The apparatus of claim 2, wherein the container has a hexagonal shape when viewed from a top-down perspective.

6. The apparatus of claim 2, wherein the container has a triangular shape when viewed from a top-down perspective.

7. The apparatus of claim 2, wherein the container has a polygonal shape having at least five sides when viewed from a top-down perspective.

8. The apparatus of claim 2, wherein the container has at least one internal light source disposed within the container.

9. The apparatus of claim 2, wherein the container has at least one light source disposed on an outside of the container.

10. An apparatus comprising:
a container, wherein the container has a first side, a second side, a first end, and a second end, wherein the first end has a first rope connection portion, wherein the container has a hollow interior that receives a plurality of items, and wherein the first side and the second side slant towards the first rope connection portion on the first end of the container;

a first amount of rope that extends from the first rope connection portion; and a second amount of rope that extends from a second rope connection portion, wherein the first amount of rope and the second amount of rope are parts of a single piece of rope, wherein the single piece of rope extends through the first rope connection portion, through at least part of the hollow interior, and through the second rope connection portion, and wherein the first amount of rope includes a stopper that prevents the entirety of the first amount of rope from passing through the container.

11. The apparatus of claim 10, wherein the stopper is a knot of rope, a washer, or a mechanical attachment that is larger than an opening of the first rope connection portion.

* * * * *